(12) United States Patent
Yamamoto

(10) Patent No.: US 11,951,791 B2
(45) Date of Patent: Apr. 9, 2024

(54) CONTROLLER

(71) Applicant: AISIN CORPORATION, Kariya (JP)

(72) Inventor: Akihito Yamamoto, Kariya (JP)

(73) Assignee: AISIN CORPORATION, Aichi (JP)

( * ) Notice: Subject to any disclaimer, the term of this patent is extended or adjusted under 35 U.S.C. 154(b) by 613 days.

(21) Appl. No.: 17/081,430

(22) Filed: Oct. 27, 2020

(65) Prior Publication Data

US 2021/0138862 A1 May 13, 2021

(30) Foreign Application Priority Data

Nov. 7, 2019 (JP) ................................ 2019-202587

(51) Int. Cl.
| | | |
|---|---|---|
| *B60G 17/00* | (2006.01) | |
| *B60G 17/018* | (2006.01) | |
| *B60G 17/019* | (2006.01) | |
| *G06N 3/08* | (2023.01) | |

(52) U.S. Cl.
CPC ....... *B60G 17/0182* (2013.01); *B60G 17/019* (2013.01); *G06N 3/08* (2013.01); *B60G 2400/252* (2013.01)

(58) Field of Classification Search
CPC .............. B60G 17/0182; B60G 17/019; B60G 2400/252; G06N 3/08
USPC ......................................................... 701/37
See application file for complete search history.

(56) References Cited

U.S. PATENT DOCUMENTS 6,137,886 A * 10/2000 Shoureshi ............. F16F 15/002
  381/71.8
2018/0182071 A1  6/2018 Ayari et al.
2019/0241038 A1  8/2019 Katsuyama
2020/0198581 A1* 6/2020 Ette .......................... B60R 25/31
2020/0210818 A1* 7/2020 Terasaki ................... G06N 3/04
2020/0215867 A1* 7/2020 Park ......................... B60R 11/04
2022/0187847 A1* 6/2022 Cella ................. G05B 19/41885
2022/0332335 A1* 10/2022 Milton ...................... G06N 3/08

FOREIGN PATENT DOCUMENTS

| JP | 2018109976 A | 7/2018 |
| JP | 2019135120 A | 8/2019 |
| JP | 6605170 B1 | 11/2019 |

OTHER PUBLICATIONS

Fredrik Gustafsson, "Determining the initial states in forward-backward filtering", Submitted to IEEE Trans. on Signal Processing, vol. 44, Apr. 1996, pp. 988-992.
MATLAB/Simulink, "Easy-to-understand Control Engineering", 6-3-1 1st order lag element published by Morikita Publishing Co., Ltd., publication date at least as early as Sep. 13, 2019, pp. 118-120 with partial translation.

* cited by examiner

*Primary Examiner* — Mahmoud S Ismail
(74) *Attorney, Agent, or Firm* — BUCHANAN INGERSOLL & ROONEY PC

(57) ABSTRACT

A controller includes: a noise reduction processing unit that acquires a sensor signal, which is based on an output from a sensor that detects time-series data and includes a noise, and that reduces the noise included in the sensor signal on the basis of a recurrent neural network trained so as to learn a correspondence relationship between a first signal including the noise corresponding to the sensor signal and a second signal indicating the first signal from which the noise has been removed; and a control processing unit that controls an actuator on the basis of an output from the noise reduction processing unit.

6 Claims, 5 Drawing Sheets

CONTROLLER

CROSS REFERENCE TO RELATED APPLICATIONS

This application is based on and claims priority under 35 U.S.C. § 119 to Japanese Patent Application 2019-202587, filed on Nov. 7, 2019, the entire content of which is incorporated herein by reference.

TECHNICAL FIELD

The present disclosure relates to a controller.

BACKGROUND DISCUSSION

In the related art, a technique of, when a control based on a sensor signal based on the output from a sensor that detects time-series data is executed, reducing noise in a high-frequency band included in the sensor signal with a low-pass filter is known. An example of a known technique includes JP2019-135120A (Patent reference 1).

However, in the related art as described above, noise in a low-frequency band cannot be completely reduced, and a phase delay may occur in a high-frequency band. In this case, the performance of a control based on the sensor signal may degrade.

A need thus exists for a controller which is not susceptible to the drawback mentioned above.

SUMMARY

A controller as an example of the present disclosure includes a noise reduction processing unit that acquires a sensor signal, which is based on an output from a sensor that detects time-series data and includes a noise, and that reduces the noise included in the sensor signal on the basis of a recurrent neural network trained so as to learn a correspondence relationship between a first signal including the noise corresponding to the sensor signal and a second signal indicating the first signal from which the noise has been removed; and a control processing unit that controls an actuator on the basis of an output from the noise reduction processing unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments and modification examples of the present disclosure will be described with reference to the drawings. The configurations of the embodiments and modification examples described below, and the functions and effects brought by the configurations are merely examples, and the present disclosure is not limited to the following contents.

Embodiments

Figure 1:
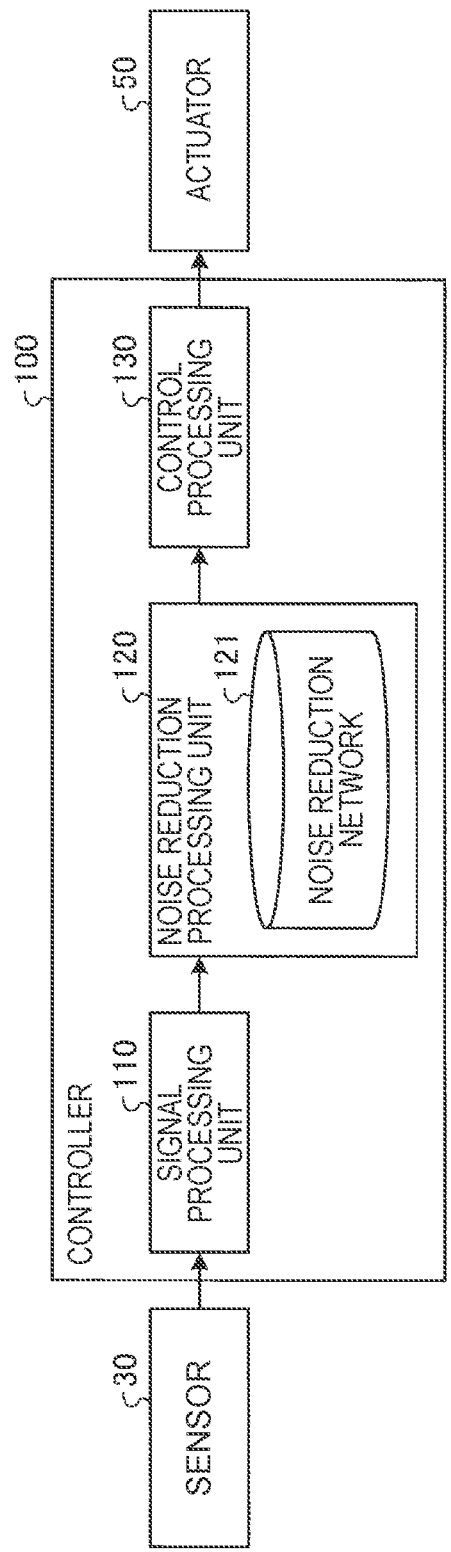
FIG. 1 is an exemplary and schematic block diagram illustrating a configuration of a controller according to an embodiment.

FIG. 1 is an exemplary and schematic block diagram illustrating the configuration of a controller 100 according to an embodiment.

As illustrated in FIG. 1, the controller 100 according to the embodiment is configured to control an actuator 50 depending on the output from a sensor 30. The controller 100 is configured as, for example, a microcomputer including hardware resources such as a processor and a memory.

In addition, in the following, as an example, an example in which the sensor 30 and the actuator 50 are mounted on a vehicle, that is, the controller 100 is configured as an electronic control unit (ECU) that is a microcomputer mounted on the vehicle will be described. However, the technique of the embodiment can be applied to general control other than the control of the vehicle.

Additionally, in the following, as an example, the sensor 30 is a state quantity sensor that detects time-series data relating to the state quantity of the vehicle, and more specifically, a displacement sensor (vehicle height sensor) that detects time-series data relating to the vertical displacement of the vehicle. An example in which the actuator 50 is configured as a suspension actuator that controls a suspension of the vehicle will be described. However, in the embodiment, the combination of the sensor 30 and the actuator 50 may have any type as long as the sensor 30 and the actuator 50 correspond to each other.

Here, in the related art, a technique of, when a control based on a sensor signal based on the output from the sensor 30, as described above, which detects the time-series data, is executed, reducing noise in a high-frequency band included in the sensor signal with a low-pass filter is known.

However, in the related art as described above, noise in a low-frequency band cannot be completely reduced, and a phase delay may occur in the high-frequency band (refer to FIGS. 5A and 5B to be described below for an example). In this case, the performance of a control based on the sensor signal may degrade.

Thus, in the embodiment, the controller 100 is configured as follows to realize more appropriately reducing the noise of the sensor signal and suppressing the degradation of the performance of the control based on the sensor signal.

More specifically, the controller 100 includes a signal processing unit 110, a noise reduction processing unit 120, and a control processing unit 130. These configurations can be realized, for example, as a result of a processor of the controller 100 configured as the microcomputer reading and executing a computer program stored in the memory, that is, by the cooperation between hardware and software. However, in the embodiment, at least some or all of these configurations may be realized only by hardware such as a dedicated circuit (circuitry).

The signal processing unit 110 executes signal processing on the output from the sensor 30. The signal processing is, for example, differential processing. Accordingly, in a case where the sensor 30 is configured as a vehicle height sensor, the signal processing unit 110 can differentiate the detection result of the vehicle height sensor and output a sensor signal indicating the change rate of the stroke of the suspension.

The sensor signal output from the signal processing unit 110 may include various noises that can be classified into electromagnetic interference (EMI) and electromagnetic susceptibility (EMS). For example, the sensor signal includes noise generated by electromagnetic or mechanical factors due to the influence of the external environment or internal environment when the sensor 30 detects the time-series data, noise generated due to the signal processing of the signal processing unit 110, and the like.

The noise reduction processing unit 120 reduces noise included in the sensor signal. More specifically, the noise reduction processing unit 120 uses a noise reduction network 121 to reduce the noise included in the sensor signal output from the signal processing unit 110.

As illustrated in the following FIGS. 2 to 4, the noise reduction network 121 is configured as a recurrent neural network (RNN) trained to learn a correspondence relationship between a first signal including noise corresponding to the sensor signal and a second signal indicating the first signal from which the noise has been removed.

Figure 2:
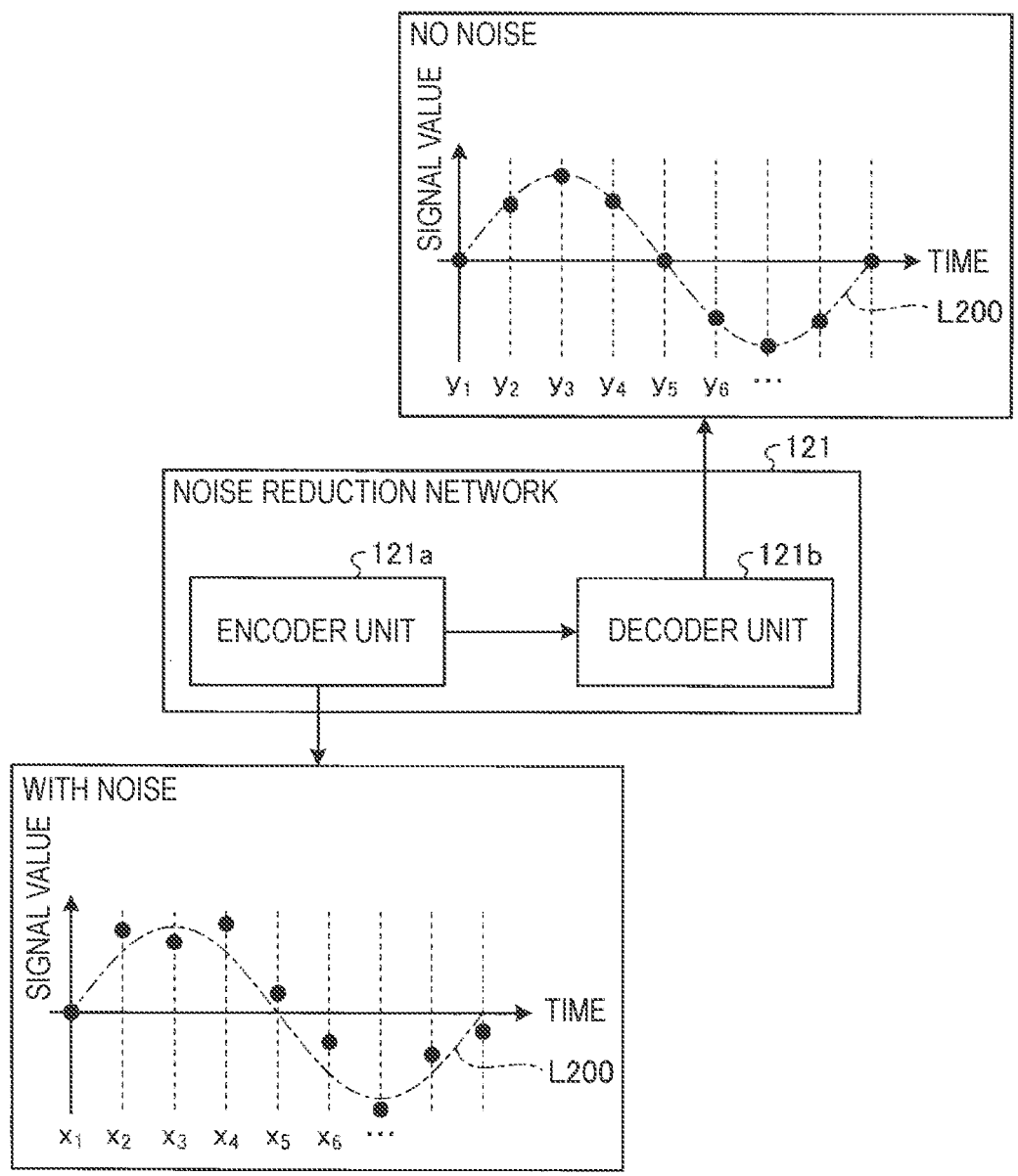
FIG. 2 is an exemplary and schematic block diagram illustrating a configuration of a noise reduction network according to the embodiment.

FIG. 2 is an exemplary and schematic block diagram illustrating the configuration of the noise reduction network 121 according to the embodiment.

As illustrated in FIG. 2, the noise reduction network 121 according to the embodiment is configured as a sequence to sequence (Seq2Seq) model. More specifically, the noise reduction network 121 includes an encoder unit 121a that receives an input of a sensor signal including noise and executes encoding processing, and a decoder unit 121b that executes decoding processing on the basis of an encoder result by the encoder unit 121a and outputs a sensor signal in which no noise is included.

For example, in the example illustrated in FIG. 2, data $x_1$, $x_2$, $x_3$, $x_4$, $x_5$, . . . , which are indicated with black circles plotted at predetermined time intervals, are exemplified as inputs to the encoder unit 121a. Since the black circles indicating these data $x_1$, $x_2$, $x_3$, $x_4$, $x_5$, . . . are plotted along an approximately sinusoidal alternate long and short dash line L200 but are not plotted so as to exactly coincide with the alternate long and short dash line L200, the black circles correspond to sensor signals including noise.

Meanwhile, in the example illustrated in FIG. 2, data $y_1$, $y_2$, $y_3$, $y_4$, $y_5$, . . . indicated by black circles plotted at predetermined time intervals are exemplified as the output from the decoder unit 121b. Since the black circles indicating these data $y_1$, $y_2$, $y_3$, $y_4$, $y_5$, . . . are plotted so as to coincide with the sinusoidal alternate long and short dash line L200, the black circles correspond to sensor signals including no noise.

The noise reduction network 121 according to the embodiment is pre-trained by machine learning so as to receive inputs of time-series data indicating the outputs of the sensor signals including noise for each time, such as the above-described data $x_1$, $x_2$, $x_3$, $x_4$, $x_5$, . . . and to output time-series data indicating the outputs of the sensor signals including no noise for each time, such as the data $y_1$, $y_2$, $y_3$, $y_4$, $y_5$, . . . .

In addition, in the example illustrated in FIG. 2, a configuration in which the sensor signals including no noise have a sinusoidal waveform is exemplified, but this is merely an example. In the embodiment, a configuration in which sensor signals having waveforms other than the sinusoidal waveform is used instead of the sensor signals having the sinusoidal waveform is also conceivable.

Hereinafter, a specific configuration of the encoder unit 121a and the decoder unit 121b of the noise reduction network 121 according to the embodiment will be described with reference to FIGS. 3 and 4. However, the configurations illustrated in the following FIGS. 3 and 4 are merely examples.

Figure 3:
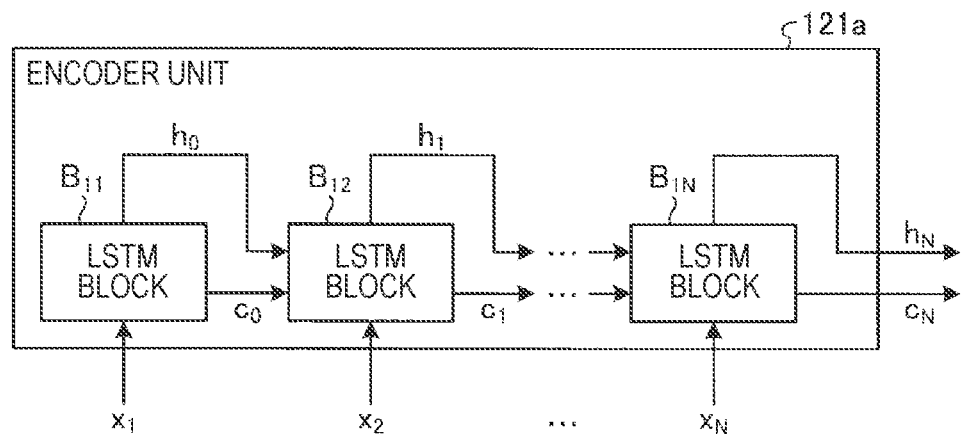
FIG. 3 is an exemplary and schematic block diagram illustrating an example of the configuration of an encoder unit of the noise reduction network according to the embodiment.

FIG. 3 is an exemplary and schematic block diagram illustrating an example of the configuration of the encoder unit 121a of the noise reduction network 121 according to the embodiment.

As illustrated in FIG. 3, the encoder unit 121a according to the embodiment is configured on the basis of a long short-term memory (LSTM). That is, the encoder unit 121a is configured by using a plurality of (for example, N) LSTM blocks $B_{11}$, $B_{12}$, . . . $B_{1N}$. The configuration of each of the LSTM blocks $B_{1N}$ is a general configuration including an input gate, an output gate, and a forget gate.

The LSTM block $B_{11}$ receives the input of the data $x_1$ and delivers data hi indicating an output corresponding to the input and data ci indicating a storage cell to the following LSTM block $B_{12}$. The blocks after the LSTM block $B_{12}$ also operate in the same manner, and the $N_{th}$ LSTM block $B_{1N}$ receives the input of data $x_N$ and delivers data $h_N$ indicating an output corresponding to the input and data $c_N$ indicating a storage cell to the outside (that is, the decoder unit 121b) of the encoder unit 121a.

Figure 4:
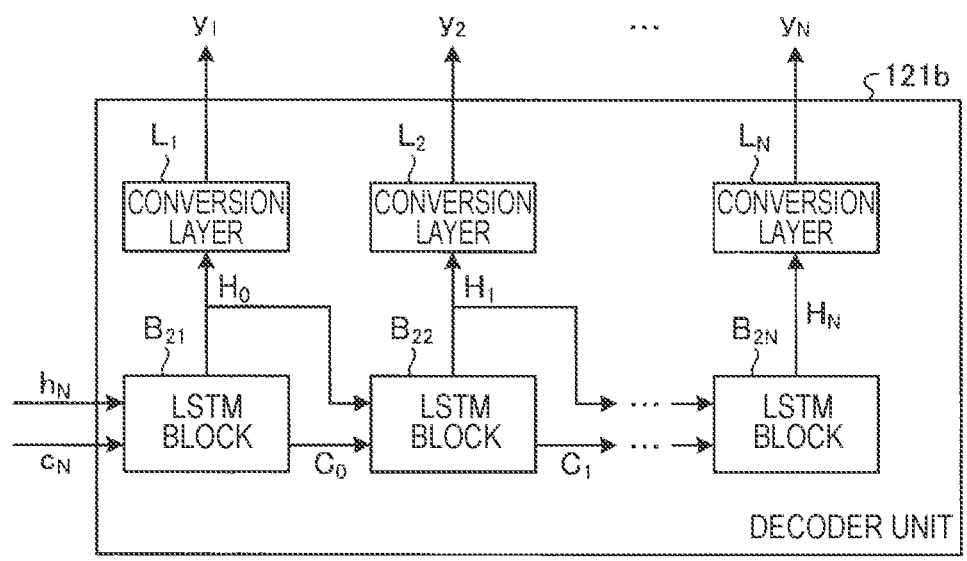
FIG. 4 is an exemplary and schematic block diagram illustrating an example of the configuration of a decoder unit of the noise reduction network according to the embodiment.

FIG. 4 is an exemplary and schematic block diagram illustrating an example of the configuration of the decoder unit 121b of the noise reduction network 121 according to the embodiment.

As illustrated in FIG. 4, the decoder unit 121b according to the embodiment is also configured on the basis of the LSTM, similarly to the above-described encoder unit 121a. That is, the decoder unit 121b is also configured by using a plurality of (for example, N) LSTM blocks $B_{21}$, $B_{22}$, . . . $B_{2N}$. The configuration of each of the LSTM blocks $B_{21}$, $B_{22}$, . . . $B_{2N}$ is a general configuration including an input gate, an output gate, and a forget gate, similarly to the above-described LSTM blocks $B_{11}$, $B_{12}$, . . . $B_{1N}$.

However, unlike the above-described encoder unit 121a, the decoder unit 121b includes a plurality of (for example, N) conversion layers $L_1$, $L_2$, . . . $L_N$ corresponding to the LSTM blocks $B_{21}$, $B_{22}$, . . . $B_{2N}$. The conversion layers $L_1$, $L_2$, . . . $L_N$ convert the data $H_1$, $H_2$ . . . , $H_N$ indicating the output from the LSTM blocks $B_{21}$, $B_{22}$, . . . $B_{2N}$, respectively, into the data $y_1$, $y_2$, . . . $y_N$ corresponding to the sensor signals.

The LSTM block $B_{21}$ receives the inputs of the data $h_N$ and $c_N$ from the encoder unit 121a, delivers the data $H_1$ indicating an output corresponding to the inputs to the conversion layer $L_1$, and delivers the data $H_1$ and the data $C_1$ indicating the storage cell to the next LSTM block $B_{22}$. The blocks after the LSTM block $B_{22}$ also operate in the same manner, and the $N_{th}$ LSTM block $B_2N$ delivers the data $h_N$ indicating an output corresponding to the input to the conversion layer $L_N$.

In this way, the noise reduction network 121 according to the embodiment is configured on the basis of the recurrent neural network configured by the Seq2Seq model based on the LSTM. More specifically, in the embodiment, the noise reduction network 121 is configured as a result of executing weight and bias training to be set on the LSTM blocks $B_{11}$, $B_{12}$, ... $B_{1N}$, the LSTM blocks $B_{21}$, $B_{22}$, ... $B_{2N}$, and the conversion layers $L_1$, $L_2$, ... $L_N$ so that the recurrent neural network as described above learns the correspondence relationship between the first signal corresponding to the sensor signal including noise and the second signal indicating the first signal from which noise has been removed.

In addition, in the embodiment, the second signal serving as teacher data for learning is generated, for example, by executing filter processing based on a forward-backward filtering technique on the first signal. According to this technique, it is possible to generate, from the first signal, the second signal in which noise reduction and phase delay avoidance are compatible.

Returning to FIG. 1, the control processing unit 130 calculates a command value for controlling the actuator 50 on the basis of the output from the noise reduction processing unit 120. More specifically, in a case where the actuator 50 is configured as the suspension actuator, the control processing unit 130 can calculate a command value for making the ride comfort and driving stability of the vehicle compatible at a higher level on the basis of a sensor signal in which the phase delay is suppressed and the noise is reduced which is output from the noise reduction processing unit 120.

Here, the effects (results) of the noise reduction by the technique according to the embodiment will be briefly described in comparison with a comparative example. In the following, as an example, a description will be made on the assumption that objects to which the noise reducing technique is applied are sensor signals indicating the change rate of the stroke of the suspension.

Figure 5A:
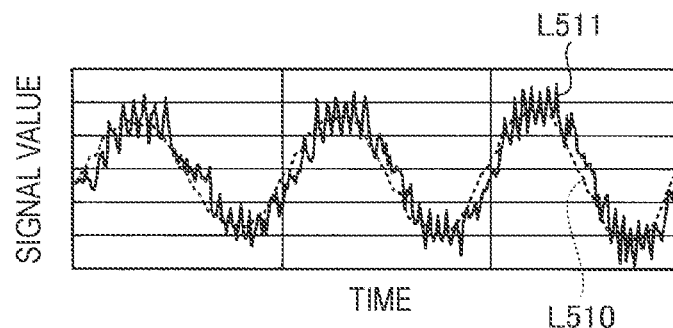
FIGS. 5A and 5B are exemplary and schematic views illustrating an example of the results of noise reduction by a technique according to a comparative example.
Figure 5B:
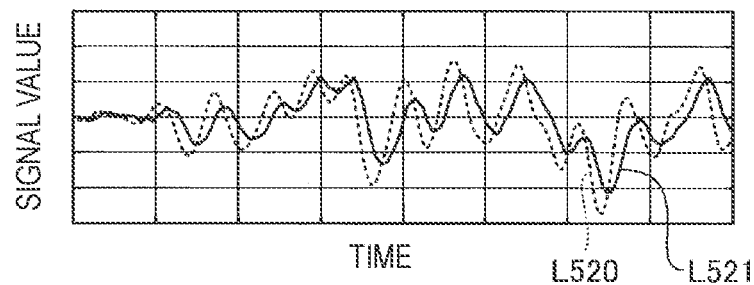

FIGS. 5A and 5B are exemplary and schematic views illustrating an example of results of the noise reduction by a technique according to the comparative example. In the technique according to the comparative example, noise (in the high-frequency band) is reduced from sensor signals through a simple low-pass filter with the same idea as the aforementioned related art.

FIG. 5A illustrates an example of a waveform, in the low-frequency band, of sensor signals from which noise has been reduced by the technique according to the comparative example. In the example illustrated in FIG. 5A, a broken line L510 corresponds to measured values of the change rate of the suspension stroke, and a solid line L511 corresponds to estimated values of the change rate of the suspension stroke obtained by differentiating the detection results of the vehicle height sensor. As can be seen by comparing the broken line L510 and a solid line L511, it can be said that the noise of the estimated values is not sufficiently reduced in the technique according to the comparative example.

Additionally, FIG. 5B illustrates an example of a waveform, in the high-frequency band, of sensor signals from which noise has been reduced by the technique according to the comparative example. In the example illustrated in FIG. 5B, a broken line L520 corresponds to measured values of the change rate of the suspension stroke, and a solid line L521 corresponds to estimated values of the change rate of the suspension stroke obtained by differentiating the detection results of the vehicle height sensor. As can be seen by comparing the broken line L520 and the solid line L521, it can be said that, in the technique according to the comparative example, the noise of the estimated values is reduced but the phase delay of the estimated values occur with respect to the phases of the measured values.

In this way, in the technique according to the comparative example, the noise in the low-frequency band can not be completely reduced, and the phase delay in the high-frequency band occurs. Thus, if the estimated values are used for control, it can be said that inconvenience is likely to occur. However, since it is difficult to actually mount a sensor for acquiring the measured values on the vehicle, it is desired to improve the accuracy of the estimated values acquired on the basis of the detection results of the vehicle height sensor.

Thus, according to the technique according to the embodiment, it is possible to improve the accuracy of the estimated values acquired on the basis of the detection results of the vehicle height sensor, as illustrated in the following FIGS. 6A and 6B.

Figure 6A:
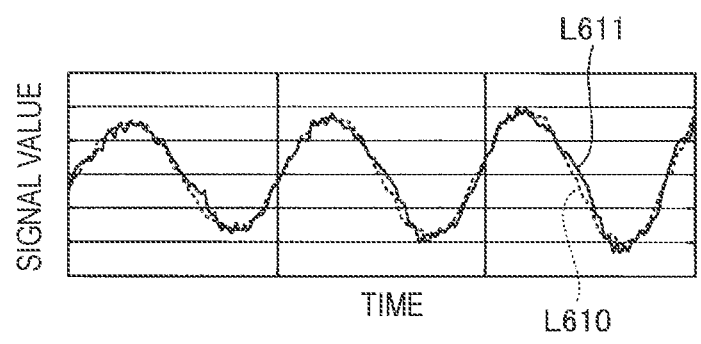
FIGS. 6A and 6B are exemplary and schematic views illustrating an example of the results of noise reduction by the technique according to the embodiment.
Figure 6B:
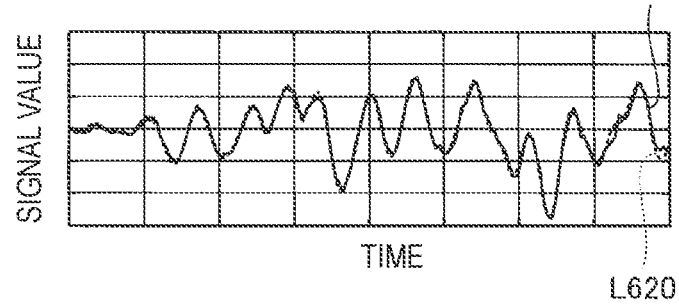

FIGS. 6A and 6B are exemplary and schematic views illustrating an example of the results of the noise reduction by the technique according to the embodiment. In the technique according to the embodiment, as previously mentioned, noise is reduced from the sensor signals by the noise reduction network 121 pre-trained by the machine learning.

FIG. 6A illustrates an example of a waveform, in a low-frequency band, of sensor signals from which noise has been reduced by the technique according to the embodiment. In the example illustrated in FIG. 6A, a broken line L610 corresponds to measured values of the change rate of the suspension stroke, and a solid line L611 corresponds to estimated values of the change rate of the suspension stroke obtained by differentiating the detection results of the vehicle height sensor. As can be seen by comparing the broken line L610 and the solid line L611, in the technique according to the embodiment, the estimated values and the measured values substantially coincide with each other. Thus, it can be said that the noise of the estimated values is sufficiently reduced.

Additionally, FIG. 6B illustrates an example of a waveform, in the high-frequency band, of sensor signals from which noise has been reduced by the technique according to the embodiment. In the example illustrated in FIG. 6B, a broken line L620 corresponds to measured values of the change rate of the suspension stroke, and a solid line L621 corresponds to estimated values of the change rate of the suspension stroke obtained by differentiating the detection results of the vehicle height sensor. As can be seen by comparing the broken line L620 and the solid line L621, in the technique according to the embodiment, the estimated values and the measured values substantially coincide with each other. Thus, it can be said that the noise of the estimated values is sufficiently reduced, and the phase delay as illustrated in the above-described FIG. 5B does not occur.

In this way, according to the technique according to the embodiment, unlike the technique according to the comparative example, the noises in both the low-frequency band and the high-frequency band can be sufficiently reduced, and no phase delay occurs. Therefore, according to the technique according to the embodiment, the accuracy of the estimated values acquired by the vehicle height sensor can be improved. Thus, it is possible to suppress the degradation of the control performance due to noise.

As described above, the controller 100 according to the embodiment includes the noise reduction processing unit 120 and the control processing unit 130.

The noise reduction processing unit 120 acquires a sensor signal, which is based on the output from the sensor 30 that detects the time-series data and includes noise, and reduces the noise included in the sensor signal on the basis of the noise reduction network 121. The noise reduction network 121 is the recurrent neural network trained to learn the correspondence relationship between the first signal including the noise corresponding to the sensor signal and the second signal indicating the first signal from which the noise has been removed. The control processing unit 130 controls the actuator 50 on the basis of the output from the noise reduction processing unit 120.

According to the configuration as described above, the noise of the sensor signal can be more suitably reduced on the basis of the appropriately trained noise reduction network 121 (refer to FIGS. 6A and 6B), and the degradation of the performance of the control based on the sensor signal can be suppressed.

Here, in the embodiment, the sensor 30 includes the state quantity sensor that detects the time-series data relating to the state quantity of the vehicle. According to such a configuration, it is possible to suppress the degradation of the performance of the control using the time-series data relating to the state quantity of the vehicle.

More specifically, in the embodiment, the state quantity sensor includes the displacement sensor (vehicle height sensor) that detects the time-series data relating to the vertical displacement of the vehicle as the state quantity of the vehicle, and the actuator 50 includes the suspension actuator that controls the suspension of the vehicle. According to such a configuration, it is possible to suppress the degradation of the performance of the suspension control using the time-series data relating to the vertical displacement of the vehicle.

Additionally, the controller 100 according to the embodiment further includes the signal processing unit 110. The signal processing unit 110 is provided between the sensor 30 and the noise reduction processing unit 120 and executes the signal processing on the output from the sensor 30. The noise reduction processing unit 120 acquires the output from the signal processing unit 110 as a sensor signal, and reduces at least the noise generated when the sensor 20 detects the time-series data and the noise generated due to the signal processing by the signal processing unit 110, the noises being included in the sensor signal. According to such a configuration, at least the noise generated when the sensor 20 detects the time-series data and the noise generated due to the signal processing by the signal processing unit 110 can be reduced, the accuracy of the result of the signal processing can be improved, and the degradation of the performance of the control based on the result of the signal processing can be suppressed.

In addition, in the embodiment, the signal processing unit 110 executes the differential processing as the signal processing. According to such a configuration, it is possible to improve the accuracy of the result of the differential processing and suppress the degradation of the performance of the control based on the result of the signal processing.

Additionally, in the embodiment, the noise reduction network 121 is configured by the Seq2Seq model based on the LSTM. According to such a configuration, the noise reduction network 121 can be configured in a form suitable for reducing the noise of the time-series data.

Modification Example

In addition, in the above-described embodiment, the configuration in which the sensor 30 is the vehicle height sensor and the actuator 50 is the suspension actuator is exemplified.

However, the technique according to the present disclosure can be applied to any configuration as long as the actuator is controlled by using the detection result of the sensor. That is, the technique according to the present disclosure can be applied not only to the configuration in which an in-vehicle actuator other than the suspension actuator is controlled by using the detection result of an in-vehicle sensor other than the vehicle height sensor but also to a configuration in which a general actuator is controlled by using the detection result of a general sensor in a field other than the vehicle.

Additionally, in the above-described embodiment, the configuration in which the noise generated due to the differential processing is reduced is mainly exemplified. However, the technique according to the present disclosure can also be applied to a configuration in which noise generated due to integration processing is reduced. Therefore, the techniques according to the present disclosure can be applied to a configuration for reducing the noise generated due to, for example, conversion processing of various state quantities, accompanied by differential processing or integration processing, such as conversion processing between displacement, velocity, acceleration, and jerk and conversion processing between angle, angular velocity, angular acceleration, and angular jerk.

Additionally, in the above-described embodiment, the recurrent neural network used for the noise reduction is configured by the Seq2Seq model based on the LSTM. However, as a modification example, it is also conceivable to configure the recurrent neural network used for the noise reduction by using a gated recurrent unit (GRU), a Bi-directional RNN, or the like. Additionally, as a modification example, a configuration in which an Attention function is added and multi-layering, bidirectionality and skip connection are further added to the configuration according to the above-described embodiment is also conceivable.

Additionally, in the above-described embodiment, the configuration in which the noise reduction is executed after the signal processing is exemplified. However, as a modification example, a configuration in which the signal processing is executed after the noise reduction is also conceivable, as illustrated in the following FIG. 7.

Figure 7:
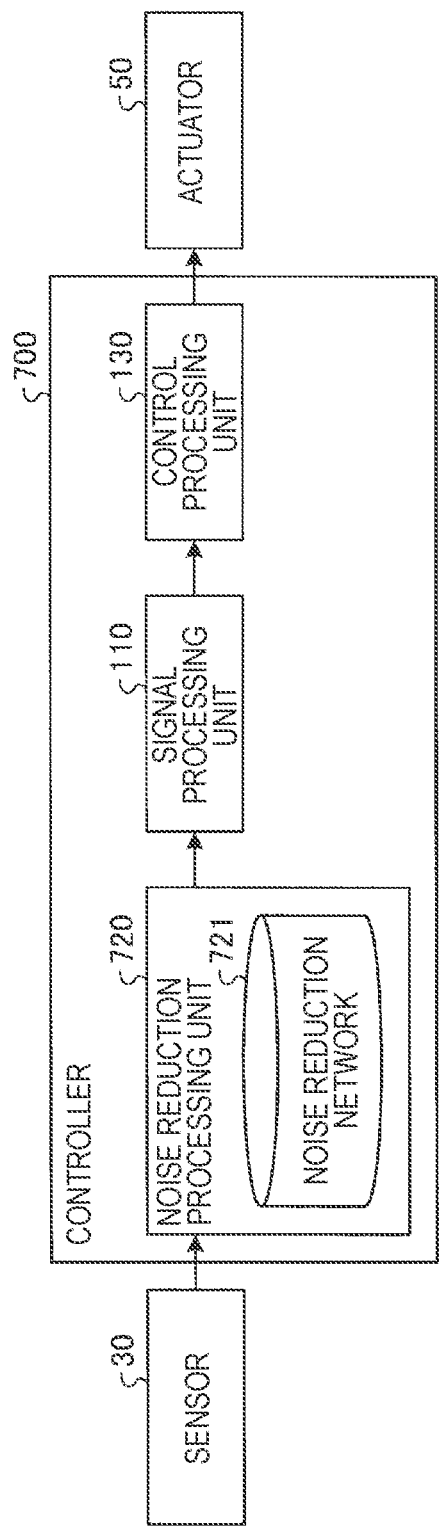
FIG. 7 is an exemplary and schematic block diagram illustrating a configuration of a controller according to a modification example of the embodiment.

FIG. 7 is an exemplary and schematic block diagram illustrating the configuration of a controller 700 according to a modification example of the embodiment.

As illustrated in FIG. 7, the controller 700 according to the modification example includes a noise reduction processing unit 720 that reduces the noise of a sensor signal output from the sensor 30 by using a noise reduction network 721, between the sensor 30 and the signal processing unit 110. In this modification example, the signal processing unit 110 executes signal processing on the output from the noise reduction processing unit 720, and the control processing unit 130 controls the actuator 50 on the basis of the output from the signal processing unit 110.

That is, in the modification example illustrated in FIG. 7, the signal processing unit 110 is provided between the noise reduction processing unit 720 and the control processing unit 130 and executes signal processing on a sensor signal which is output from the noise reduction processing unit 720 and from which noise has been reduced. The noise reduction processing unit 720 acquires the output from the sensor 30 as a sensor signal and reduces at least the noise included in the sensor signal and generated when the sensor 30 detects the time-series data, and the control processing unit 130 controls the actuator 50 on the basis of the output from the signal processing unit 110 according to the output from the noise reduction processing unit 720.

In addition, in the modification example illustrated in FIG. 7, the noise reduction network 721 is configured as the recurrent neural network, similarly to the noise reduction network 121 according to the above-described embodiment. The noise reduction network 721 is pre-trained on the basis of appropriately prepared teacher data so as to reduce the noise generated when the sensor 30 detects the time-series data, that is, to appropriately reduce the noise included in the output from the sensor 30.

According to the modification example illustrated in FIG. 7, the accuracy of the result of the signal processing can be improved by reducing at least the noise generated when the sensor 30 detects the time-series data, and the degradation of the performance of the control based on the result of the signal processing can be suppressed.

A controller as an example of the present disclosure includes a noise reduction processing unit that acquires a sensor signal, which is based on an output from a sensor that detects time-series data and includes a noise, and that reduces the noise included in the sensor signal on the basis of a recurrent neural network trained so as to learn a correspondence relationship between a first signal including the noise corresponding to the sensor signal and a second signal indicating the first signal from which the noise has been removed; and a control processing unit that controls an actuator on the basis of an output from the noise reduction processing unit.

According to the above-described controller, the noise of the sensor signal can be more suitably reduced on the basis of the appropriately trained recurrent neural network, and the degradation of the performance of the control based on the sensor signal can be suppressed.

In the above-described controller, the sensor may include a state quantity sensor that detects the time-series data relating to a state quantity of a vehicle. According to such a configuration, it is possible to suppress the degradation of the performance of the control using the time-series data relating to the state quantity of the vehicle.

In this case, the state quantity sensor may include a displacement sensor that detects the time-series data relating to a vertical displacement of the vehicle as the state quantity of the vehicle, and the actuator may include a suspension actuator that controls a suspension of the vehicle. According to such a configuration, it is possible to suppress the degradation of the performance of the suspension control using the time-series data relating to the vertical displacement of the vehicle.

The above-described controller may further include a signal processing unit that is provided between the sensor and the noise reduction processing unit to execute signal processing on the output from the sensor, and the noise reduction processing unit may acquire the output from the signal processing unit as the sensor signal and reduce at least the noise generated when the sensor detects the time-series data and the noise generated due to the signal processing included in the sensor signal. According to such a configuration, at least the noise generated when the sensor detects the time-series data and the noise generated due to the signal processing by the signal processing unit can be reduced, the accuracy of the result of the signal processing can be improved, and the degradation of the performance of the control based on the result of the signal processing can be suppressed.

In this case, the signal processing unit may execute differential processing or integration processing as the signal processing. According to such a configuration, it is possible to improve the accuracy of the result of the differential processing or integration processing and suppress the degradation of the performance of the control based on the result of the signal processing.

The above-described controller may further include a signal processing unit that is provided between the noise reduction processing unit and the control processing unit to execute signal processing on the sensor signal which is output from the noise reduction processing unit and from which the noise has been reduced, the noise reduction processing unit may acquire the output from the sensor as the sensor signal and reduce at least the noise included in the sensor signal and generated when the sensor detects the time-series data, and the control processing unit may control the actuator on the basis of an output from the signal processing unit according to the output from the noise reduction processing unit. According to such a configuration, the accuracy of the result of the signal processing can be improved by reducing at least the noise generated when the sensor detects the time-series data, and the degradation of the performance of the control based on the result of the signal processing can be suppressed.

In the above-described controller, the recurrent neural network may be configured by a sequence to sequence (Seq2Seq) model based on long short-term memory (LSTM). According to such a configuration, the recurrent neural network can be configured in a form suitable for the noise reduction of the time-series data.

Although the embodiment and modification examples of the present disclosure have been described above, the above-described embodiment and modification examples are merely examples, and the scope of the invention is not intended to be limited. The above-described novel embodiment and modification examples can be carried out in various forms, and various omissions, replacements, and changes can be made without departing from the spirit of this disclosure. The above-described embodiment and modification examples are included in the scope and spirit of the invention and are also included in the inventions described in the claims and the scope equivalent thereto.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A controller comprising:
a noise reduction processing unit that acquires a sensor signal, which is based on an output from a state quantity sensor that detects time-series data, said time-series data comprising sequential measured values relating to a state quantity of a vehicle and including a noise, and that reduces the noise included in the sensor signal on the basis of a recurrent neural network trained so as to learn a correspondence relationship between a first signal including the noise corresponding to the sensor signal and a second signal indicating the first signal from which the noise has been removed;

wherein the controller is configured to control an actuator on the basis of an output from the noise reduction processing unit.

2. The controller according to claim 1, wherein
the state quantity sensor includes a displacement sensor that detects the time-series data relating to a vertical displacement of the vehicle as the state quantity of the vehicle, and
the actuator includes a suspension actuator that controls a suspension of the vehicle.

3. The controller according to claim 1, wherein:
the controller is configured to execute signal processing on the output from the state quantity sensor, and
the noise reduction processing unit acquires the output on which the signal processing has been executed as the sensor signal and reduces at least the noise generated when the state quantity sensor detects the time-series data and the noise generated due to the signal processing included in the sensor signal.

4. The controller according to claim 3, wherein
the controller executes differential processing or integration processing as the signal processing.

5. The controller according to claim 1, wherein:
the controller is configured to execute signal processing on the sensor signal which is output from the noise reduction processing unit and from which the noise has been reduced,
the noise reduction processing unit acquires the output from the state quantity sensor as the sensor signal and reduces at least the noise included in the sensor signal and generated when the state quantity sensor detects the time-series data, and
the controller controls the actuator on the basis of the sensor signal on which the signal processing has been executed.

6. The controller according to claim 1, wherein
the recurrent neural network is configured by a sequence to sequence (Seq2Seq) model based on long short-term memory (LSTM).

* * * * *